United States Patent

Wakabayashi

[11] Patent Number: 6,130,403
[45] Date of Patent: Oct. 10, 2000

[54] LASER BEAM MACHINING APPARATUS, CONTROL METHOD THEREFOR, AND RECORDING MEDIUM FOR RECORDING A CONTROL PROGRAM THEREFOR

[75] Inventor: Koji Wakabayashi, Tokyo, Japan

[73] Assignee: NEC Corporation, Tokyo, Japan

[21] Appl. No.: 09/124,849

[22] Filed: Jul. 30, 1998

[30] Foreign Application Priority Data

Jul. 30, 1997 [JP] Japan ..................................... 9-203679

[51] Int. Cl.$^7$ ............................. B23K 26/36; B23K 26/20
[52] U.S. Cl. ................................ 219/121.68; 219/121.63; 219/121.73; 700/166
[58] Field of Search ....................... 219/121.67, 121.68, 219/121.69, 121.72, 121.73, 121.75, 121.63, 121.64; 700/166

[56] References Cited

U.S. PATENT DOCUMENTS

| | | | |
|---|---|---|---|
| 3,665,483 | 5/1972 | Becker et al. | 219/121.68 |
| 4,547,651 | 10/1985 | Maruyama | 219/121.67 |
| 4,908,493 | 3/1990 | Susemihl | 219/121.67 |
| 5,017,755 | 5/1991 | Yahagi et al. | 219/121.68 |
| 5,057,664 | 10/1991 | Johnson et al. | 219/121.69 |

FOREIGN PATENT DOCUMENTS

| | | |
|---|---|---|
| 59-189315 | 10/1984 | Japan . |
| 2-6089 | 1/1990 | Japan . |
| 4-288988 | 10/1992 | Japan . |

*Primary Examiner*—Geoffrey S. Evans
*Attorney, Agent, or Firm*—Foley & Lardner

[57] ABSTRACT

A laser bean machining apparatus, which includes a laser beam source and an irradiation observation unit for irradiating a laser beam at a desired position on a board mounted on a stage, includes a laser beam attenuator for controlling the energy of the laser beam, a polarization direction rotator for rotating the direction of the linearly polarized light of the laser beam, and a circularly polarizing converter for changing the linearly polarized light of the laser beam to circularly polarized light, and carries out energy control of the laser beam while making the polarization state of the laser beam optimum with respect to the shape of machining when the wire cutting and wire joining on the liquid crystal board are performed. For example, when surface machining is performed on the liquid crystal board, in the elongated shape machining, the linear polarization direction of the laser beam is aligned with the lengthwise direction, and in the small square shape machining, the laser beam is converted into circularly polarized light. Also, in the cutting and joining on a liquid crystal panel through a polarizing plate, energy control is carried out while always aligning the polarized light of laser beam with the polarization direction of the polarizing plate of the liquid crystal panel.

17 Claims, 4 Drawing Sheets

LASER BEAM MACHINING APPARATUS, CONTROL METHOD THEREFOR, AND RECORDING MEDIUM FOR RECORDING A CONTROL PROGRAM THEREFOR

BACKGROUND OF THE INVENTION

1. Field of the Invention

The present invention relates to a laser beam machining apparatus and, more particularly, to an apparatus used for wire cutting and wire joining on a liquid crystal board or a liquid crystal panel in manufacturing a liquid crystal display.

2. Description of the Related Art

Conventionally, a laser beam machining apparatus for performing wire cutting and wire joining on a liquid crystal board or a liquid crystal panel comprises a laser beam source, an irradiation optical system having a laser irradiation function and microscope function, and X-Y stage for holding the liquid crystal board or the liquid crystal panel.

In the laser beam machining apparatus of this type, it is very important to increase the laser machining accuracy, to achieve homogeneous machining and to prevent the occurrence of the machining faults. Therefore, for example, after transmitting a liquid crystal element composed of many liquid crystal cells, a laser beam is reflected by a polarization beam splitter, and only the selected polarized component of laser beam is converged and irradiated on an object being, for example, a wire pattern of the liquid crystal cell, machined via an objective lens. Also, the film thickness distribution of the object being machined is measured beforehand, and a proper voltage is applied to each liquid crystal cell of the liquid display element so that the optimum power density for machining the film at the machined position will be obtained. Thereby, the transmissivity of each liquid crystal cell is adjusted, and the laser beam having the optimum power density is irradiated on the object being machined.

This technique has been disclosed in Japanese Patent Application Laid-Open No. 4-288988. With the technique described in this Publication, even if the thickness of a metal film formed on a liquid crystal board is nonuniform, this metal film is removed completely by a laser beam without producing damage to a base.

In performing wire cutting and wire joining on a liquid crystal board and liquid crystal panel, however, fine machining of wire having a wire width on the order of submicron and a length 50 times or more the width, square machining of 2 $\mu$m, and the like are performed. That is to say, it is required to perform machining an object having a region to be machined with a greatly different length-to-width ratio. In this case, in the conventional laser beam machining apparatus, the repeatability of machining cannot sometimes be maintained uniformly at some angle of the fine wire to be machined because of the influence of polarized state of the irradiated laser beam.

Also, when a wire within a liquid crystal panel is machined, a laser beam especially of a visible wavelength zone is immediately absorbed and attenuated by a polarizing plate affixed to the panel surface, so that the homogeneity of machining quality deteriorates.

SUMMARY OF THE INVENTION

An object of the present invention is to provide a laser beam machining apparatus which solves the above problems, can maintain the repeatability of machining uniformly, and can keep the homogeneity of machining quality.

The laser beam machining apparatus in accordance with the present invention, which includes a laser beam source and an irradiation observation unit for irradiating a laser beam at a desired position on a board mounted on a stage, comprises a laser beam attenuator for controlling the energy of the laser beam, a polarized light rotating device for rotating the linearly polarized light of the laser beam, and a circularly polarizing converter for changing the linearly polarized light of the laser beam to circularly polarized light, and carries out energy control of the laser beam while making the laser polarized light optimum with respect to the shape of machining when the wire cutting and wire joining on the liquid crystal board are performed.

For example, when surface machining is performed on the liquid crystal board, in the elongated shape machining, the linear polarization direction of the laser beam is aligned with the lengthwise direction, and in the small square shape machining, the laser beam is converted into circularly polarized light.

By this configuration, the repeatability of machining can be maintained uniformly and more accurate machining can be achieved independently of the angle of the fine wire to be machined and the length-to-width ratio of the region to be machined.

Also, in the cutting and joining on a liquid crystal panel through a polarizing plate, energy control is carried out while always aligning the polarized light of laser beam with the polarization direction of the polarizing plate of the liquid crystal panel.

By this configuration, the laser beam is prevented from being absorbed and attenuated by the polarizing plate of the liquid crystal panel, and the energy of the laser beam is stabilized, by which more homogeneous machining is enabled. By the highly accurate machining and highly homogeneous machining, the occurrence of faults in the laser beam machining process is inhibited, and thereby the yield can be improved.

DETAILED DESCRIPTION OF PREFERRED EMBODIMENTS

Figure 1:
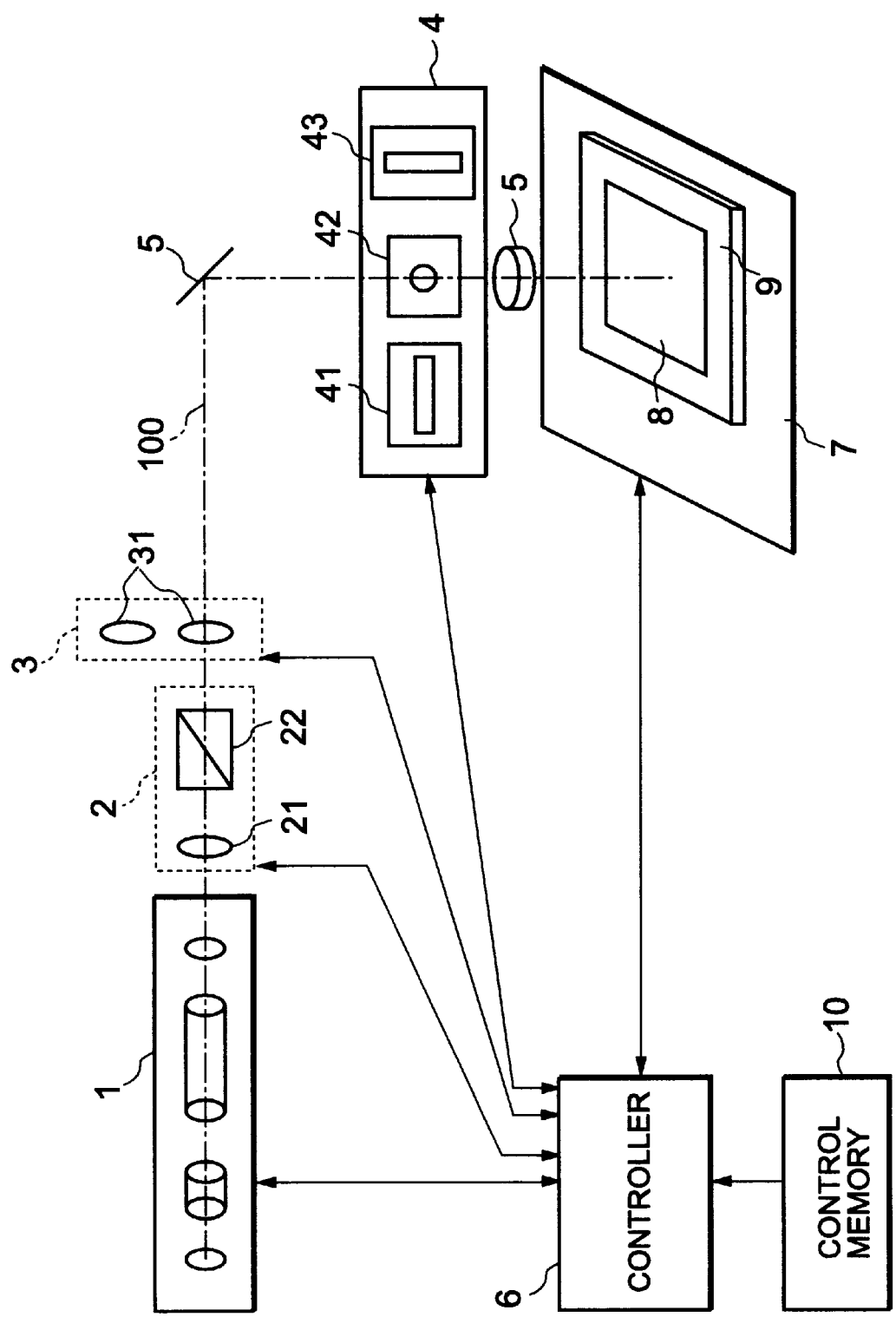
FIG. 1 is a view showing a configuration of laser beam machining apparatus in accordance with an embodiment of the present invention.

An embodiment of the present invention will be described below with reference to the accompanying drawings. In FIG. 1, a laser beam machining apparatus in accordance with an embodiment of the present invention is made up of a laser beam source 1, a laser beam attenuator 2, a circularly polarizing converter 3, an optical slit 4, an optical system 5, a controller 6, a table 7, and a control memory 10.

Also, the laser beam attenuator 2 has a $\lambda/2$ plate 21 and a polarizing prism 22, the circularly polarizing converter 3 has a $\lambda/4$ plate 31, and the optical slit 4 has a transverse slit 41, a circular slit 42, and a longitudinal slit 43.

The laser beam source 1 is, for example, a Q switch laser. In the process of Q switch pulse oscillation, a laser beam 100 emitted from the laser beam source 1 is in a linearly polarized state directed toward one direction. That is to say, the oscillation direction of electric field component of the laser beam 100 is directed toward that direction.

The λ/2 plate 21, which is disposed on the optical path of the laser beam 100 emitted from the laser beam source 1, is controlled in rotation around the optical axis of the laser beam 100 on the basis of the command from the controller 6. When the angle between the polarization direction of the incident laser beam 100 and the main section of the λ/2 place 21 is taken as θ, the polarization direction of the laser beam 100 leaving the λ/2 plate 21 is turned 2θ with respect to the polarization direction of the incident laser beam.

As the polarizing prism 22, for example, a Glan-Taylor polarizing prism is used. The polarizing prism 22, which is disposed on the optical path of the outgoing laser beam 100 from the λ/2 plate 21, is controlled in rotation around the optical axis of the laser beam 100 on the basis of the command from the controller 6. After passing through the polarizing prism 22, the laser beam 100 whose polarization direction is turned by the λ/2 plate 21 is changed to a linearly polarized light of P wave component of the polarizing prism 22. Also, a laser beam output from the polarizing prism 22 is attenuated with respect to the energy of laser beam incident based on the polarizing angle of the incident laser beam 100. Specifically, when the angle between the polarization direction of laser beam incident to the polarizing prism 22 and the polarization direction of outgoing beam from the polarizing prism 22 is taken as α, the energy of laser beam transmitting the polarizing prism 22 is attenuated to $\cos^2(\alpha)$ times the energy incident to the polarizing prism 22.

The λ/4 plate 31 is inserted onto or separated from the optical path of the laser beam 100 on the basis of the command from the controller 6. When being disposed on the optical path of the laser beam 100, the λ/4 plate 31 is controlled in rotation around the optical path on the basis of the command from the controller 6 so that the angle between the polarization direction of incident laser beam and the main section of the λ/4 plate 31 is 45 degrees. Therefore, the laser beam 100 output from the λ/4 plate 31 is changed to circularly polarized light.

The optical system 5 includes an optical component for changing the direction of optical path of the laser beam 100 leaving the circularly polarizing converter 3 to the direction of the stage 7, for example, a reflecting optical component such as a mirror, beam splitter, and dichroic mirror, and an image forming lens for forming an image of the laser beam passing through a slit on the machined surface of the object being machined.

The laser beam 100 output from the λ/4 plate 31, by way of the reflecting optical component of the optical system 5, passes through any of the transverse slit 41, the circular slit 42, and the longitudinal slit 43 of the optical slit 4, which is selected by the controller 6. The circular slit 42 is, for example, a circular slit with a diameter of 3 μm. Also, the transverse slit 41 and the longitudinal slit 43 are rectangular slits with a length-to-width ratio of 2 to 50, and the longitudinal slit 43 is a slit disposed by turning the transverse slit 41 through 90 degrees. Generally, the wiring pattern of the liquid crystal board and liquid crystal panel to be machined is configured by only two longitudinal and transverse lines at right angles, and the lengthwise directions of the transverse slit 41 and the longitudinal slit 43 are set to be in the direction corresponding to the longitudinal direction and transverse direction of wiring pattern of the liquid crystal board and liquid crystal panel mounted on the table 7.

The outgoing laser beam from the image forming lens of the optical system 5 is irradiated on the object being machined mounted on the table 7 moved by the command from the controller 6 to form an image. As the table 7, there is used a table which moves the object being machined at least in the X and Y directions. Also, as shown in FIG. 1, when the object being machined is a liquid crystal panel 9, the laser beam is irradiated on the wiring portion of the liquid crystal panel 9 through a polarizing plate 8 of the liquid crystal panel to form an image.

The above-mentioned laser beam source 1, the laser beam attenuator 2, the circularly polarizing converter 3, an optical slit 4, and the table 7 are combined for control depending on whether a liquid crystal board (not shown) or the liquid crystal panel 9 is machined or whether wire cutting or wire joining is performed.

An operation procedure for machining a liquid crystal board in accordance with an embodiment of the present invention will be described with reference to FIGS. 1 to 4.

In laser beam machining in accordance with an embodiment of the present invention, the controller 6 first determines whether or not the laser beam machining is the machining of a liquid crystal board, on the basis of information indicated from the outside (hereinafter called externally indicated information) (Step S1 in FIG. 2). If judging that it is the machining of a liquid crystal board, the controller 6 determines whether the machining is cutting or joining (Step S2 in FIG. 2). If judging that it is cutting, the controller 6 determines whether the cutting is transverse or longitudinal (Step S3 in FIG. 2).

Figure 2:
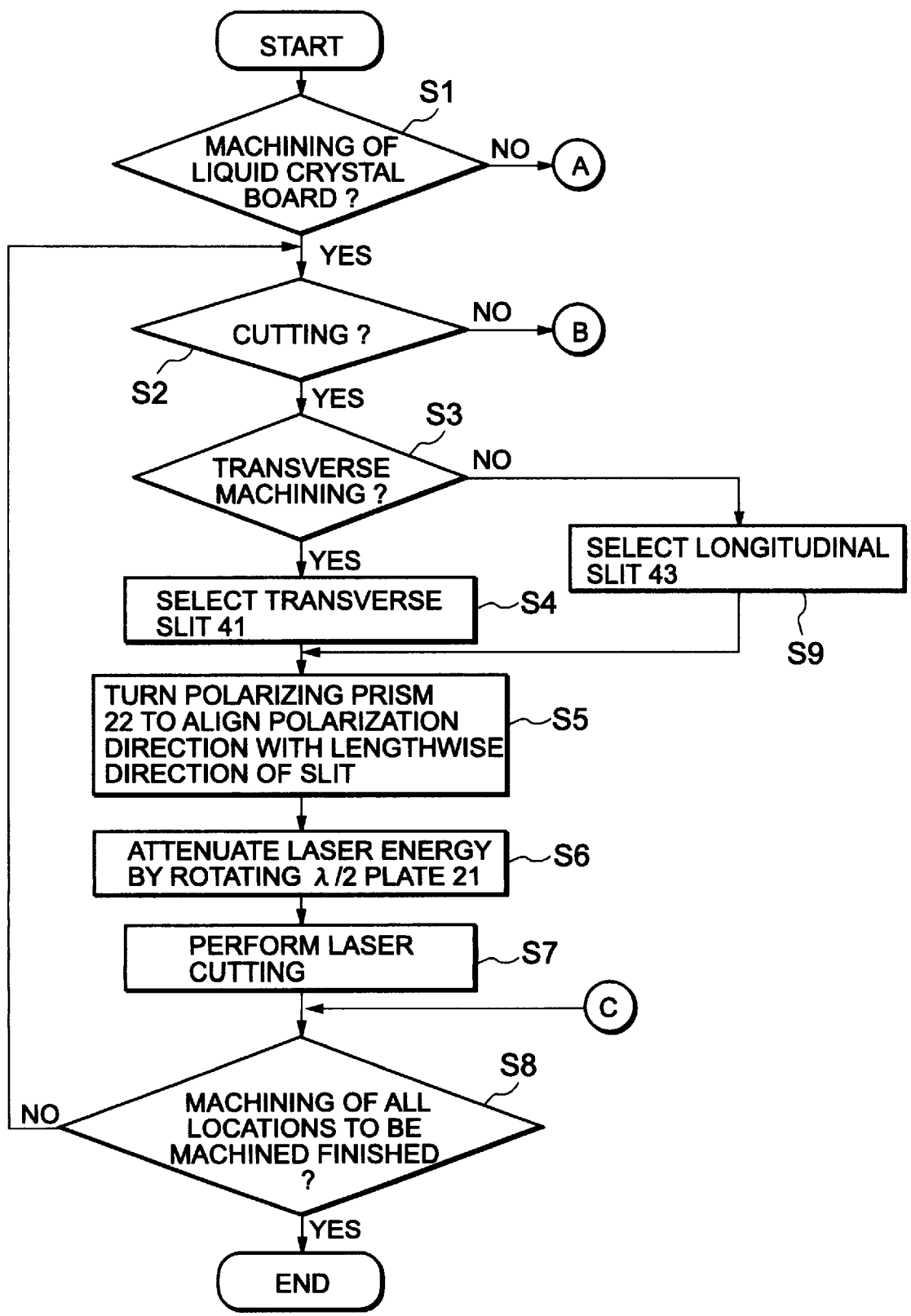
FIG. 2 is a flowchart showing an operation procedure for a laser beam machining apparatus in accordance with an embodiment of the present invention.

If judging that the cutting is transverse, the controller 6 moves the optical slit 4 to select the transverse slit 41 (Step S4 in FIG. 2). Next, the polarizing prism 22 is turned to align the linear polarization direction of the laser beam 100 passing through the slit with the lengthwise direction of the slit (Step S5 in FIG. 2).

The controller 6 successively attenuates the laser energy of the laser beam 100 to a predetermined output by rotating the λ/2 plate 21 (Step S6 in FIG. 2). Thereafter, the controller 6 performs laser cutting on the liquid crystal board (Step S7 in FIG. 2). Thereby, machining of one location is finished. Therefore, the controller 6 determines whether or not machining of all locations to be machined on the liquid crystal board has been finished (Step S8 in FIG. 2). If all locations have been machined, the machining operation is finished. If any location remains unmachined, the program goes back to Step S2.

On the other hand, if the controller 6 judges that the cutting is longitudinal, it moves the optical slit 4 to select the longitudinal slit 43 (Step S9 in FIG. 2). Then, the polarizing prism 22 is turned to align the linear polarization direction of the laser beam 100 passing through the slit with the lengthwise direction of the slit (Step S5 in FIG. 2).

The controller 6 successively attenuates the laser energy of the laser beam 100 to a predetermined output by rotating the λ/2 plate 21 (Step S6 in FIG. 2). Thereafter, the controller 6 performs laser cutting on the liquid crystal board (Step S7 in FIG. 2).

Thereby, machining of one location is finished. Therefore, the controller 6 determines whether or not machining of all locations to be machined on the liquid crystal board has been finished (Step S8 in FIG. 2). If all locations have been machined, the machining operation is finished. If any location remains unmachined, the program goes back to Step S2.

Figure 3:
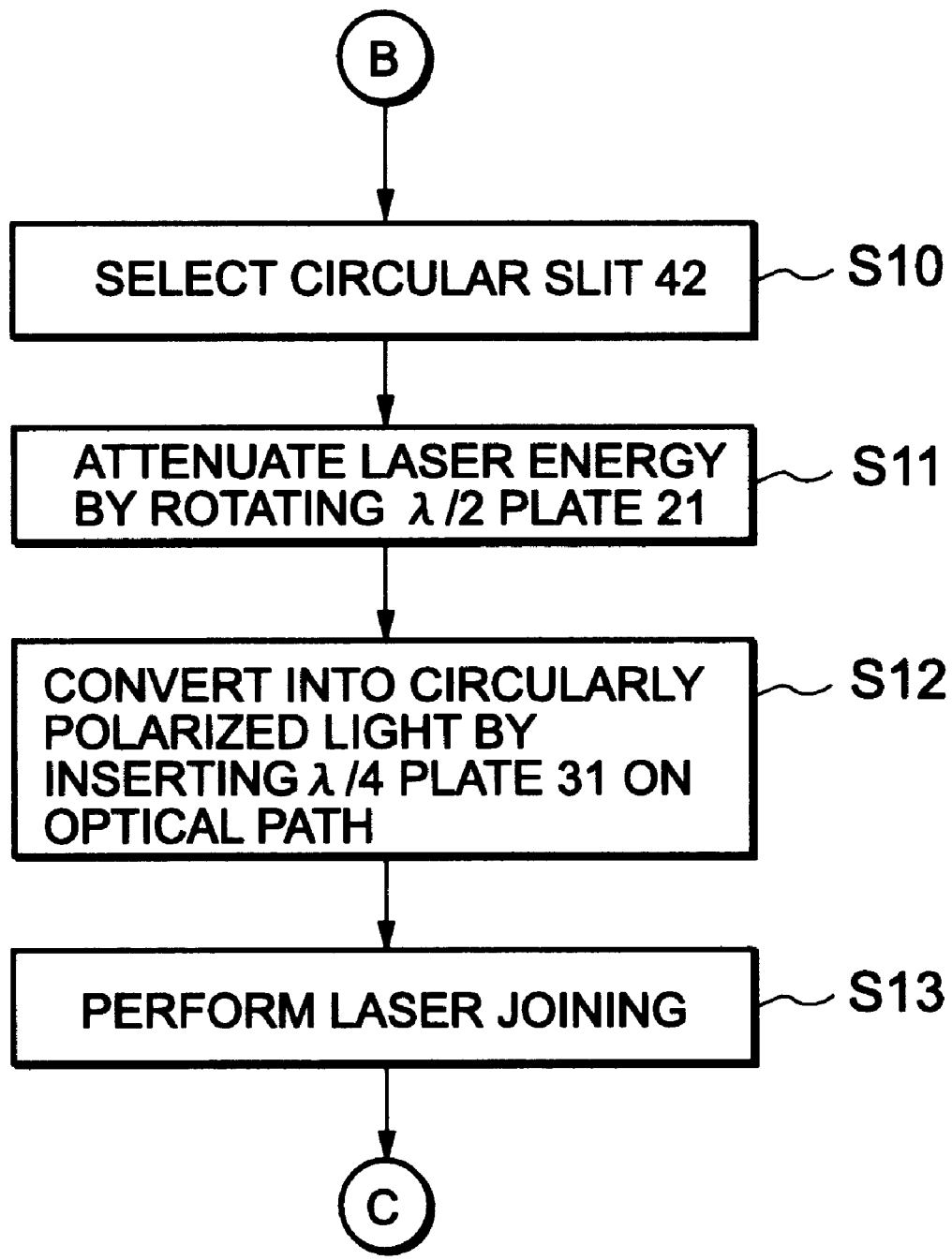
FIG. 3 is a flowchart showing an operation procedure for a laser beam machining apparatus in accordance with an embodiment of the present invention.

On the other hand, if the controller 6 judges that the machining is joining, it moves the optical slit 4 to select the circular slit 42 (Step S10 in FIG. 3), and attenuates the laser energy of the laser beam 100 to a predetermined output by rotating the λ/2 plate 21 (Step S11 in FIG. 3).

Subsequently, the controller 6 inserts the λ/4 plate 31 on the optical path of the laser beam 100 to thereby convert the laser beam 100 into circularly polarized light and output it (Step S12 in FIG. 3). Thereafter, the controller 6 performs laser joining on the liquid crystal board (Step S13 in FIG. 3).

Thereby, machining of one location is finished. Therefore, the controller 6 determines whether or not machining of all locations to be machined on the liquid crystal board has been finished (Step S8 in FIG. 2). If all locations have been machined, the machining operation is finished. If any location remains unmachined, the program goes back to Step S2. Here, the shape of the circular slit 42 is circular (for example, the diameter is 3 μm,) so that the laser joining quality on the circumference will be uniform.

Figure 4:
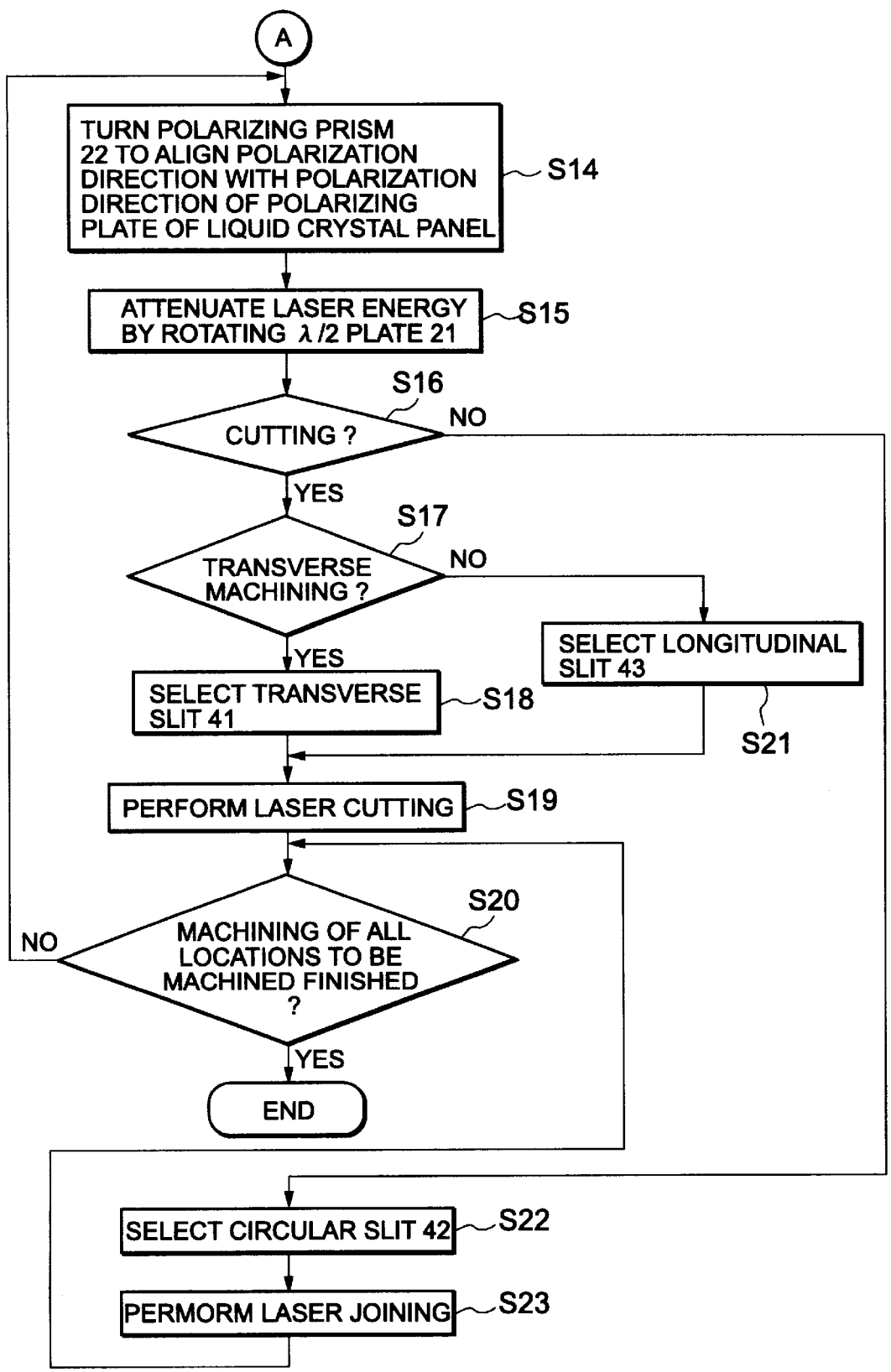
FIG. 4 is a flowchart showing an operation procedure for a laser beam machining apparatus in accordance with an embodiment of the present invention.

In the above-mentioned laser beam machining, if the controller 6 judges, on the basis of the externally indicated information, that the machining is the machining of the liquid crystal panel 9, it first turns the polarizing prism 22 to align the P wave, the polarization direction, of the polarizing prism 22 with the polarization direction of the polarizing plate 8 of the liquid crystal panel 9 (Step S14 in FIG. 4).

Next, the controller 6 turns the λ/2 plate 21 to thereby attenuate the laser energy of the laser beam 100 (Step S15 in FIG. 4). Thereafter, the controller 6 determines whether the machining is cutting or joining (Step S16 in FIG. 4). If judging that it is cutting, the controller 6 determines whether the cutting is transverse or longitudinal (Step S17 in FIG. 4).

If judging that the cutting is transverse, the controller 6 moves the optical slit 4 to select the transverse slit 41 (Step S18 in FIG. 4). Thereafter, the controller 6 performs laser cutting on the liquid crystal panel 9 (Step S19 in FIG. 4).

Thereby, machining of one location is finished. Therefore, the controller 6 determines whether or not machining of all locations to be machined on the liquid crystal panel 9 has been finished (Step S20 in FIG. 4). If all locations have been machined, the machining operation is finished. If any location remains unmachined, the program goes back to Step S14.

On the other hand, if the controller 6 judges that the cutting is longitudinal, it selects the longitudinal slit 43 (Step S21 in FIG. 4), and performs laser cutting on the liquid crystal panel 9 (Step S19 in FIG. 4). Thereby, machining of one location is finished. Therefore, the controller 6 determines whether or not machining of all locations to be machined on the liquid crystal panel 9 has been finished (Step S20 in FIG. 4). If all locations have been machined, the machining operation is finished. If any location remains unmachined, the program goes back to Step S14.

On the other hand, if the controller 6 judges that the machining is joining, it moves the optical slit 4 to select the circular slit 42 (Step S22 in FIG. 4), and performs laser joining on the liquid crystal panel 9 (Step S23 in FIG. 4). Thereby, machining of one location is finished. Therefore, the controller 6 determines whether or not machining of all locations to be machined on the liquid crystal panel 9 has been finished (Step S20 in FIG. 4). If all locations have been machined, the machining operation is finished. If any location remains unmachined, the program goes back to Step S14.

The content of the above processing is recorded in the control memory 10 as a control program, and the control memory 10 is realized by a ROM (read only memory), floppy disc, or the like.

Also, a Glan-Thompson polarizing prism may be used as the polarizing prism 22. In this case, the difference is that only the S polarized component, not the P polarized component, is transmitted through the polarizing prism 22.

Also, a dichroic sheet polarizer may be used in place of the polarizing prism 22.

Also, there may be provided a plural kinds of longitudinal and transverse slits having various length-to-width ratios. In this case, the controller 6 selects a slit with the optimum length-to-width ratio by analyzing the shape of machining specified by the externally indicated information.

Also, there may be provided a plural kinds of circular slits having different diameters.

Also, if the shape of machining specified by the externally indicated information includes slantwise machining or curved machining, slits matching the shape of machining are provided. The controller 6 selects a slit with the optimum length-to-by analyzing the shape of machining specified by the externally indicated information.

Also, the stage may be configured as follows: An XYθ table is used, and when the object being machined is set on the stage and machining is started, the controller detects the pattern direction of the object being machined. If this direction does not agree with the direction of the slit, the stage is turned to make this direction agree with the slit direction.

Thus, the processing procedure differs between the liquid crystal board and the liquid crystal panel 9. However, the feature is that the polarization control of the laser beam 100 by the polarizing prism 22 and the energy attenuation control by the λ/2 plate 21 are carried out according to priority such that the machining accuracy and machining homogeneity are optimum.

That is to say, when wire cutting and wire joining are performed on the liquid crystal board, more accurate machining can be achieved by controlling the energy of the laser beam 100 while the laser polarized light is made optimum with respect to the shape of machining.

Also, when cutting and joining are performed through the polarizing plate 8 on the liquid crystal panel 9, more homogeneous machining can be performed by controlling the energy of the laser beam 100 while the polarized light of the laser beam 100 is always aligned with the polarization direction of the polarizing plate 8 of the liquid crystal panel 9.

By the highly accurate machining and highly homogeneous machining, the occurrence of faults in the laser beam machining process can be inhibited, and thereby the yield can be improved. Accordingly, the repeatability of machining can be maintained uniformly, and the homogeneity of machining quality can be kept.

What is claimed is:

1. A laser beam machining apparatus for machining a desired location on a liquid crystal board and liquid crystal panel mounted on a stage by a laser beam emitted from a laser beam source, comprising:

attenuator for controlling the energy of said laser beam;

polarization direction rotator for rotating the linear polarization direction of said laser beam;

circularly polarizing converter for changing the linearly polarized light of said laser beam to circularly polarized light;

means for moving said circularly polarizing converter between a first position on an optical path of said laser beam and a second position out of said optical path; and controller for controlling said attenuator, said polarization direction rotator, and said means for moving said circularly polarizing converter, according to the content of machining of said liquid crystal board and liquid crystal panel.

2. A laser beam machining apparatus according to claim 1, wherein said controller is configured so that when wire cutting and wire joining on said liquid crystal board are performed, said attenuator, said polarization direction rotator, and said circularly polarizing means are controlled to control the energy of said laser beam while a polarization state of said laser beam is made optimum with respect to the shape of machining.

3. A laser beam machining apparatus according to claim 2, wherein said controller is configured so that when surface machining is performed on said liquid crystal board, in the elongated shape machining, the linear polarization direction of said laser beam is aligned with the lengthwise direction, and in the small square shape machining, said laser beam is converted into circularly polarized light.

4. A laser beam machining apparatus according to claim 1, wherein said controller is configured so that when cutting and joining on said liquid crystal panel are performed, said attenuator, said polarization direction rotator, and said circularly polarizing means are controlled to control the energy of said laser beam while the polarization direction of said laser beam is aligned with the polarization direction of a polarizing plate of said liquid crystal panel.

5. A laser beam machining apparatus according to claim 4, wherein said controller is configured so that when said liquid crystal panel is machined through the polarizing plate, the energy of said laser beam is controlled in a state in which the linear polarization direction of said laser beam always agrees with the polarization direction of said polarizing plate.

6. A laser beam machining apparatus for machining a desired location on a liquid crystal board and liquid crystal panel mounted on a stage by a laser beam emitted from a laser beam source, comprising:

polarization direction rotator for rotating the linear polarization direction of said laser beam;

a polarizing optical component for transmitting and tuning only the polarized component of said laser beam;

circularly polarizing converter for converting the laser beam transmitting said polarizing optical component into circularly polarized light at a first position on an optical path of said laser beam;

means for moving said circularly polarizing converter between said first position on an optical path of said laser beam and a second position out of said optical path; and controller for controlling the rotation of said polarization direction rotator, the turning of said polarizing optical component, and said means for moving said circularly polarizing converter, according to the shape of machining of said liquid crystal board and liquid crystal panel.

7. A laser beam machining apparatus according to claim 6, wherein the laser beam emitted from said laser beam source passes through said polarization direction rotator, and then passes through said polarizing optical component.

8. A laser beam machining apparatus according to claim 6, wherein when surface machining is performed on said liquid crystal board, in the elongated shape machining, said controller turns said polarizing optical component so that the linear polarization direction of the laser beam irradiated on said liquid crystal board agrees with the lengthwise direction of said elongated shape machining, and in the square shape machining, said controller moves said circularly polarizing converter to the first position.

9. A laser beam machining apparatus according to claim 8, wherein said controller turns said polarizing optical component so that the linear polarization direction of the laser beam irradiated on said liquid crystal board agrees with the lengthwise direction of said elongated shape machining, and then rotates said polarization direction rotator to control the energy of said laser beam.

10. A laser beam machining apparatus according to claim 6, wherein when said liquid crystal panel is machined, said controller turns said polarizing optical component so that the linear polarization direction of the laser beam irradiated on said liquid crystal panel agrees with the polarization direction of a polarizing plate of said liquid crystal panel.

11. A laser beam machining apparatus according to claim 10, wherein when said liquid crystal panel is machined, said controller turns said polarizing optical component so that the linear polarization direction of the laser beam irradiated on said liquid crystal panel agrees with the polarization direction of the polarizing plate of said liquid crystal panel, and then rotates said polarization direction rotator to control the energy of said laser beam.

12. A control method for a laser beam machining apparatus for machining a desired location on a liquid crystal board and liquid crystal panel mounted on a stage by a laser beam emitted from a laser beam source, comprising the steps of:

determining whether the machining is cutting or joining when the machining is for said liquid crystal board;

aligning the polarization direction of said laser beam with the lengthwise direction of the shape of machining when the machining is said cutting;

performing said cutting after controlling the energy of the laser beam in which the polarization direction is aligned with the lengthwise direction of the shape of machining;

controlling the energy of said laser beam when the machining is said joining; and performing said joining after changing the linearly polarized light of the laser beam to circularly polarized light.

13. A control method for a laser beam machining apparatus according to claim 12, further comprising the steps of:

aligning the polarization direction of said laser beam with the polarization direction of a polarizing plate of said liquid crystal panel when the machining is for said liquid crystal panel;

controlling the energy of the laser beam in which the polarization direction is aligned with the polarization direction of said polarizing plate;

determining whether the machining of said liquid crystal panel is cutting or joining; and performing said cutting or said joining with said laser beam.

14. A control method for a laser beam machining apparatus for machining a desired location on a liquid crystal board and liquid crystal panel mounted on a stage by a laser beam emitted from a laser beam source, comprising the steps of:

aligning the polarization direction of said laser beam with the polarization direction of a polarizing plate of said liquid crystal panel when the machining is for said liquid crystal panel;

controlling the energy of the laser beam in which the polarization direction is aligned with the polarization direction of said polarizing plate;

determining whether the machining of said liquid crystal panel is cutting or joining; and performing said cutting or said joining with said laser beam.

15. A recording medium comprising a control program for a laser beam machining apparatus for machining a desired location on a liquid crystal board and liquid crystal panel mounted on a stage by a laser beam emitted from a laser beam source, wherein said control program controls a control section of said laser beam machining apparatus and comprises:

program code for determining whether the machining is cutting or joining when the machining is for said liquid crystal board;

program code for aligning the polarization direction of said laser beam with the lengthwise direction of the shape of machining when the machining is said cutting;

program code for performing said cutting after controlling the energy of the laser beam in which polarization direction is aligned with the lengthwise direction of the shape of machining;

program code for controlling the energy of said laser beam when the machining is said joining; and program code for performing said joining after changing the linearly polarized light of the laser beam to circularly polarized light.

16. A recording medium according to claim 15, wherein said control program further comprises:

program code for aligning the polarization direction of said laser beam with the polarization direction of a polarizing plate of said liquid crystal panel when the machining is for said liquid crystal panel;

program code for controlling the energy of the laser beam in which the polarization direction is aligned with the polarization direction of said polarizing plate;

program code for determining whether the machine of said liquid crystal panel is cutting or joining;

program code for performing said cutting with said laser beam when the machining is said cutting; and program code for performing said joining with said laser beam when the machining is said joining.

17. A recording medium comprising a control program for a laser beam machining apparatus for machining a desired location on a liquid crystal board and liquid crystal panel mounted on a stage by a laser beam emitted from a laser beam source, wherein said control program controls a control section of said laser beam machining apparatus and comprises:

program code for aligning the polarization direction of said laser beam with the polarization direction of a polarizing plate of said liquid crystal panel when the machining is for said liquid crystal panel;

program code for controlling the energy of the laser beam in which the polarization direction is aligned with the polarization direction of said polarizing plate;

program code for determining whether the machining of said liquid crystal panel is cutting or joining; and program code for performing said cutting or said joining with said laser beam.

* * * * *